(12) United States Patent
Farnworth et al.

(10) Patent No.: US 6,544,465 B1
(45) Date of Patent: Apr. 8, 2003

(54) METHOD FOR FORMING THREE DIMENSIONAL STRUCTURES FROM LIQUID WITH IMPROVED SURFACE FINISH

(75) Inventors: Warren M. Farnworth, Nampa, ID (US); Kevin G. Duesman, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 198 days.

(21) Appl. No.: 09/642,133

(22) Filed: Aug. 18, 2000

(51) Int. Cl.[7] .................... B29C 35/08; B29C 41/02
(52) U.S. Cl. ................ 264/401; 264/482; 264/494
(58) Field of Search ........................ 264/401, 482, 264/494

(56) References Cited

U.S. PATENT DOCUMENTS

| | | | |
|---|---|---|---|
| 4,310,808 A | 1/1982 | Byer et al. | |
| 5,049,406 A | * 9/1991 | Geittner et al. | ............. 427/572 |
| 5,173,220 A | 12/1992 | Reiff et al. | |
| 5,264,061 A | 11/1993 | Juskey et al. | |
| 5,484,314 A | 1/1996 | Farnworth | |
| 5,705,117 A | 1/1998 | O'Connor et al. | |
| 5,888,839 A | * 3/1999 | Ino et al. | ................... 438/30 |
| 6,015,720 A | * 1/2000 | Minegishi et al. | ............ 438/30 |

* cited by examiner

Primary Examiner—Leo B. Tentoni
(74) Attorney, Agent, or Firm—TraskBritt

(57) ABSTRACT

A stereolithographic (STL) apparatus for forming structures such as semiconductor die packages which uses a laser beam focused to a generally annular "spot" having an annulus of enhanced laser power surrounding a central "hole" of reduced (or no) laser power. The structures are formed of a stack of light-polymerized photopolymer layers. Scanning of a beam having power concentrated in the annulus enables simultaneous production of a self-supporting structure having at least semisolid, smooth lateral outer polymer walls and an upper hardened polymer skin extending over liquid polymer still lying between the walls. The structure may be subjected to heat or broad source light of suitable wavelength after removal from the STL apparatus to accelerate complete polymerization of the structure to a solid state.

28 Claims, 6 Drawing Sheets

METHOD FOR FORMING THREE DIMENSIONAL STRUCTURES FROM LIQUID WITH IMPROVED SURFACE FINISH

BACKGROUND OF THE INVENTION

1. Field of the Invention

The present invention relates generally to stereolithography and, more specifically, to the use of stereolithography in forming multilayer solid structures with vertical or near-vertical sides, such structures including packages for semiconductor devices and other electronic components and assemblies thereof

2. State of the Art

In the past decade, a manufacturing technique termed "stereolithography" (STL), also known as "layered manufacturing," has evolved to a degree where it is employed in many industries.

Essentially STL, as conventionally practiced, involves utilizing a computer to generate a three-dimensional (3-D) mathematical simulation or model of an object to be fabricated, such generation usually being effected with 3-D computer-aided design (CAD) software. The model or simulation is mathematically separated or "sliced" into a large number of relatively thin, parallel, usually vertically superimposed layers, each layer having defined boundaries and other features associated with the model (and thus the actual object to be fabricated) at the level of that layer within the exterior boundaries of the object. A complete assembly or stack of all of the layers defines the entire object, and surface resolution of the object is, in part, dependent upon the thickness of the layers.

The mathematical simulation or model is then employed to generate an actual object by building the object, layer by superimposed layer. A wide variety of approaches to stereolithography by different companies has resulted in techniques for fabrication of objects from both metallic and nonmetallic materials. Regardless of the material employed to fabricate an object, stereolithographic techniques usually involve disposition of a layer of unconsolidated or unfixed material corresponding to each layer within the object boundaries, followed by selective consolidation or fixation of the material to at least a semisolid state in those areas of a given layer corresponding to portions of the object, the consolidated or fixed material also at that time being substantially concurrently bonded to a lower layer. The unconsolidated material employed to build an object may be supplied in particulate or liquid form, and the material itself may be consolidated or fixed or a separate binder material may be employed to bond material particles to one another and to those of a previously formed layer. In some instances, thin sheets of material may be superimposed to build an object, each sheet being fixed to a next lower sheet and unwanted portions of each sheet removed, a stack of such sheets defining the completed object. When particulate materials are employed, resolution of object surfaces is highly dependent upon particle size, whereas when a liquid is employed, surface resolution is highly dependent upon the minimum surface area of the liquid which can be fixed and the minimum thickness of a layer which can be generated. Of course, in either case, resolution and accuracy of object reproduction from the CAD file is also dependent upon the ability of the apparatus used to fix the material to precisely track the mathematical instructions indicating solid areas and boundaries for each layer of material. Toward that end, and depending upon the layer being fixed, various fixation approaches have been employed, including particle bombardment (electron beams), disposing a binder or other fixative (such as by ink-jet printing techniques), or irradiation using heat or specific wavelength ranges such as found in a generated laser beam.

An early application of stereolithography was to enable rapid fabrication of molds and prototypes of objects from CAD files. Thus, either male or female forms on which mold material might be disposed might be rapidly generated. Prototypes of objects might be built to verify the accuracy of the CAD file defining the object and to detect any design deficiencies and possible fabrication problems before a design was committed to large-scale production.

In more recent years, stereolithography has been employed to develop and refine object designs in relatively inexpensive materials and has also been used to fabricate small quantities of objects where the cost of conventional fabrication techniques is prohibitive for same, such as in the case of plastic objects conventionally formed by injection molding. It is also known to employ stereolithography in the custom fabrication of products generally built in small quantities or where a product design is rendered only once. Finally, it has been appreciated in some industries that stereolithography provides a capability to fabricate products, such as those including closed interior chambers or convoluted passageways, which cannot be fabricated satisfactorily using conventional manufacturing techniques.

To the inventors' knowledge, stereolithography has yet to be applied to mass production of articles in volumes of thousands or millions, or employed to produce, augment or enhance products including other, pre-existing components in large quantities, where minute component sizes are involved, and where extremely high resolution and a high degree of reproducibility of results is required. Furthermore, conventional stereolithography apparatus and methods fail to address the difficulties of precisely locating and orienting a number of pre-existing components for stereolithographic application of material thereto without the use of mechanical alignment techniques or to otherwise assure precise, repeatable placement of components.

In the electronics industry, state-of-the-art packaging of semiconductor dice is an extremely capital-intensive proposition. In many cases, discrete semiconductor dice carried on, and electrically connected to, lead frames are individually packaged with a filled-polymer material in a transfer molding process. A transfer molding apparatus is extremely expensive, costing at least hundreds of thousands of dollars in addition to the multihundred thousand dollar cost of the actual transfer molding dies in which strips of lead frames bearing semiconductor dice are disposed for encapsulation.

Further, encapsulative packaging of a semiconductor device already mounted on a substrate by molding and other presently used methods may be very difficult, time-consuming and costly. In some cases, the device may be packaged using a so-called "glob-top" of a material such as silicone, but the resulting seal is usually nonhermetic, the technique requires either substantial area around a die or a dam structure to contain the gel-like material, and the "package" boundary is not well-defined.

Use of stereolithography for packaging of semiconductor device components has been suggested. See, for example, copending U.S. patent applications Ser. Nos. 09/259,142 and 09/259,143, each filed on Feb. 26, 1999, pending, and the disclosures of each of which are hereby incorporated herein by this reference. While the feasibility and effectiveness of such a packaging technique has been proven, it has been recognized by the inventors herein that it would be desirable to achieve a surface finish on stereolithographically formed packaging and other structures which is superior to that presently obtainable.

SUMMARY OF THE INVENTION

The present invention provides an improvement to a stereolithography (STL) apparatus for forming a precisely dimensioned and finished miniature structure from a liquid or semiliquid photopolymer material by precise scanning of a beam of polymerization stimulating laser light. The structure is created by forming one or more layers of at least partially hardened or semisolid material, in which each subsequently formed layer is at least partially overlying and attached to a previously formed layer.

While the method and apparatus of the invention may be broadly applied to the fabrication of either a freeform structure or a structure attached to another object or objects, it will be exemplified herein as applied to the packaging of small items such as electronic components and, specifically, semiconductor dice. For example, a semiconductor die may be provided by this invention with a protective structure in the form of a layer of dielectric material having a controlled thickness or depth over an upper or lower surface and stacked layers located adjacent to lateral or peripheral die surfaces.

As used herein, the term "package" as employed with reference to electrical components includes partial as well as full covering of a given semiconductor die or other electronic component surface with a dielectric material and specifically includes, without limitation, partial and full covering of a bare semiconductor die as well as a semiconductor die previously configured as a so-called "chip scale" package, wherein the package itself, including the die, is of substantially the same dimensions as, or only slightly larger than, the die itself.

The packaging method of the present invention may be applied, by way of example and not limitation, to a die mounted to a lead frame (having a die mounting paddle or in a paddleless leads-over-chip (LOC), or in a leads-under-chip (LUC) configuration), mounted to a carrier substrate in a chip-on-board (COB) or board-on-chip (BOC) arrangement, to flip-chip configured semiconductor dice, or in other packaging designs, as desired.

The present invention employs computer-controlled, 3-D CAD initiated, stereolithographic techniques to apply protective and alignment structures to an electronic component such as a semiconductor die. A dielectric layer or layer segments thereof may be formed over or adjacent a single die or substantially simultaneously over or adjacent a large number of dice or die locations on a semiconductor wafer or other large-scale semiconductor substrate, individual dice or groups of dice then being singulated therefrom. The package may be formed, after singulation of the die from a wafer, to cover the lateral surfaces as well as the upper and/or lower surfaces of the die.

Precise mechanical alignment of singulated semiconductor dice or larger semiconductor substrates having multiple die locations is not required to practice the method of the present invention, which includes the use of machine vision to locate dice and features or other components thereon or associated therewith (such as lead frames, bond wires, solder bumps, fiducial marks, etc.) as well as features on a larger, carrier substrate for alignment and material disposition purposes.

In a presently preferred embodiment of the invention, the object or structure is fabricated using precisely focused electromagnetic radiation in the form of an ultraviolet (UV) wavelength laser under control of a computer and responsive to input from a machine vision system such as a pattern recognition system to fix or cure a liquid material in the form of a photopolymer.

A multilevel package structure is formed for example, by partially submerging an object such as a semiconductor die in a bath of liquid photopolymer material, the latter forming a thin layer comprising the lowermost portion of the package structure. A generally vertical laser beam of coherent radiation is controllably scanned over selected portions of the thin layer of photopolymer material for partial polymerization thereof, forming a self-supporting rigid or semirigid layer.

The object is then lowered to form a second thin layer of liquid photopolymer material over the prior, partially polymerized layer, followed by laser exposure. A stack of partially polymerized layers may thus be serially formed, comprising as many consecutive layers as are required to achieve the desired structure height.

Conventional laser systems used in STL equipment are capable of providing a focused laser beam "spot" of the desired diameter for die packaging, i.e., about 0.002–0.008 inch. While it is considered desirable to generate a laser beam which in scanning forms a spot with uniform power exposure or density throughout the spot, the power is nevertheless typically concentrated in the middle, or central, portion of the beam spot. Thus, as the polymerization-stimulating laser beam is scanned over a photopolymer material, the effective exposure and resulting initiation and stimulation of polymerization of the photopolymer will be greatest in a central region of the scanning path, with a rapid fall-off to either side. As a result, the exterior surfaces of a layered photopolymer structure's lateral walls are not immediately polymerized to a desired degree, and interstitial crevices are formed at the joints between adjacent layers. The resulting lateral wall surfaces of a photopolymer structure assume a "log cabin" appearance exemplified by a series of parallel, horizontally disposed and clearly discrete (although mutually bonded) "logs" of photopolymer. The horizontal crevices between the photopolymer logs may attract dust, moisture and other contaminants, and the effective wall thickness at the crevices is undesirably reduced.

However, even if the beam power was to be somehow evenly distributed over the beam spot, the log cabin effect cannot readily be avoided because the effective exposure time is greatest at the center of the scanning path of the round scanning beam, i.e., where there is exposure to the full diameter of the beam.

In the present invention, a conventional STL laser system is modified so as to provide a beam spot of annular configuration comprising a higher beam power density in laterally exterior portions thereof The annular beam spot surrounds a central "hole" portion with a lower (or even essentially zero) beam power density. As a result, during scanning of the beam over the surface of liquid photopolymer, the layer being formed receives higher exposure along its lateral edges, and lesser exposure in its central or inner portion, which is still adequately exposed as the annular beam spot moves laterally as the beam is scanned. The resulting, multilayer walls are thus effectively and smoothly cured and hardened without overexposure of the central portions scanned. The exposure of the central portion may be controlled by manipulation of the laser beam power to be only sufficient to initially form at least a semisolid "skin" of hardened polymer at the top of a given layer over unpolymerized material retained therebelow between two walls of at least semisolid photopolymer resulting from exposure to the annular beam spot. A subsequent full hardening step such as may be conducted in an oven after the photopolymer structure is formed accelerates the polymerization of any liquid polymer trapped within the structure and forms a single cohesive object with smooth side walls, i.e., without the aforementioned log cabin effect.

The laser system used to achieve the desired annular spot in an STL apparatus may be configured in several ways. In one embodiment, the laser system includes an unstable optical resonator whereby power flows outwardly from the optical axis of the resonator. The optical resonator may be a confocal resonator employing one concave mirror and one convex mirror. The convex mirror forms the output coupling device for providing diffraction output coupling around the periphery of the output mirror. The output beam is collimated and focused to an annulus surrounding a central "hole" of significantly reduced radiation density. In another embodiment, the laser system comprises a nitrogen ring laser.

Use of the annular beam spot in an STL apparatus for fabricating structures in accordance with the present invention results in structures having uniformly polymerized, smooth side walls. The STL fabrication of miniature structures with enhanced dimensional precision and much reduced dimensional variability is enabled by use of an annular laser beam spot employed in accordance with the present invention.

DETAILED DESCRIPTION OF THE INVENTION

Figure 1:
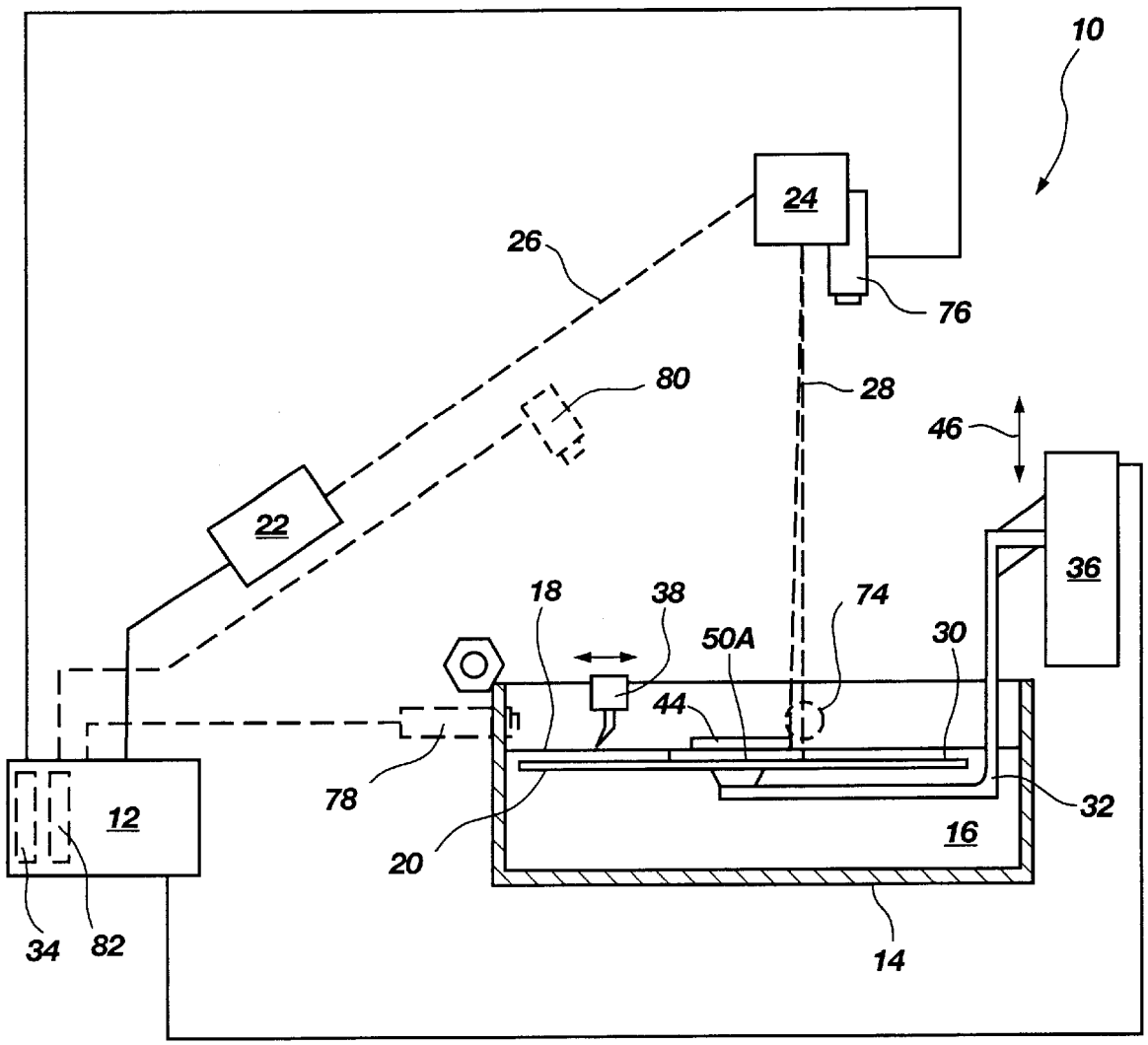
FIG. 1 is a schematic side elevation of an exemplary stereolithography apparatus of the invention suitable for use in practicing the method of the present invention.

FIG. 1 depicts schematically various components and operation of an exemplary stereolithography apparatus 10 modified to create miniature multilayer structures with smooth seamless side walls. Those of ordinary skill in the art will understand and appreciate that apparatus of other designs and manufacture may be modified to practice the method of the present invention. The preferred, basic stereolithography apparatus to which this invention pertains, as well as conventional operation of such apparatus, are described in great detail in United States Patents assigned to 3D Systems, Inc. of Valencia, Calif., such patents including, without limitation, U.S. Pat. Nos. 4,575,330; 4,929,402; 4,996,010; 4,999,143; 5,015,424; 5,058,988; 5,059,021; 5,096,530; 5,104,592; 5,123,734; 5,130,064; 5,133,987; 5,141,680; 5,143,663; 5,164,128; 5,174,931; 5,174,943; 5,182,055; 5,182,056; 5,182,715; 5,184,307; 5,192,469; 5,192,559; 5,209,878; 5,234,636; 5,236,637; 5,238,639; 5,248,456; 5,256,340; 5,258,146; 5,267,013; 5,273,691; 5,321,622; 5,344,298; 5,345,391; 5,358,673; 5,447,822; 5,481,470; 5,495,328; 5,501,824; 5,554,336; 5,556,590; 5,569,349; 5,569,431; 5,571,471; 5,573,722; 5,609,812; 5,609,813; 5,610,824; 5,630,981; 5,637,169; 5,651,934; 5,667,820; 5,672,312; 5,676,904; 5,688,464; 5,693,144; 5,695,707; 5,711,911; 5,776,409; 5,779,967; 5,814,265; 5,840,239; 5,854,748; 5,855,718; and 5,855,836. The disclosure of each of the foregoing patents is hereby incorporated herein by this reference. The stereolithographic apparatus may be modified as described in previously referenced, copending U.S. patent application Ser. No. 09/259,142 of even assignee. This earlier application relates to the use of a "machine vision" system with suitable programming of the computer controlling the stereolithographic process, eliminating the need for accurate positioning or mechanical alignment of workpieces to which material is stereolithographically applied, and expands the use to large numbers of workpieces which may have differing orientation, size, thickness and surface topography. This copending application is incorporated herein by this reference.

While the workpieces employed in the practice of the preferred embodiment of the method of the invention are, by way of example only, electronic components such as semiconductor dice, wafers, partial wafers, other substrates of semiconductor material or carrier substrates bearing integrated circuits on dice or other semiconductor structures thereon, the method and apparatus of the invention are applicable to fabricating other products including workpieces having the aforementioned variations in orientation, size, thickness and surface topography.

Figure 2:
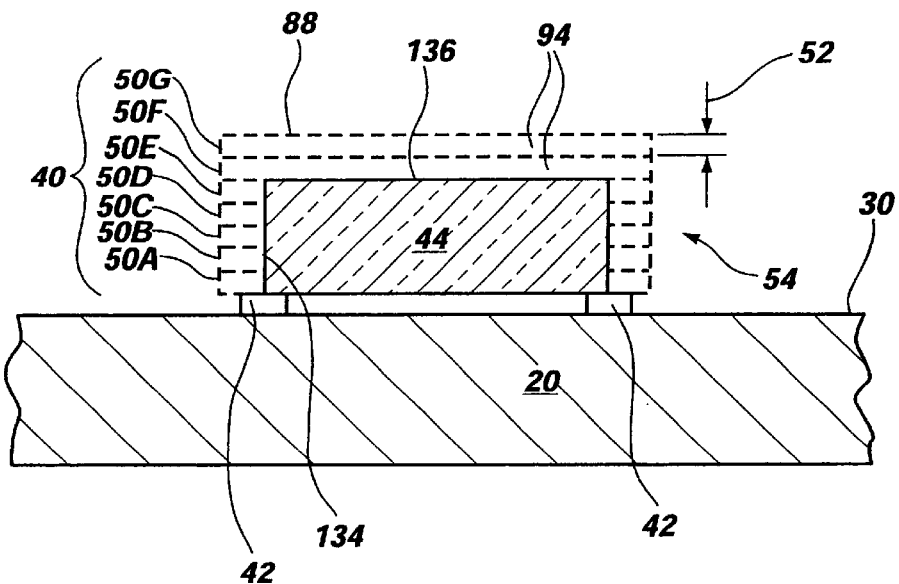
FIG. 2 is an enlarged cross-sectional side view of a portion of a platform of a stereolithographic apparatus showing an STL-fabricated object to be fabricated, comprising a stack of horizontal layers forming a package of a semiconductor die.

With reference to FIGS. 1 and 2, a 3-D CAD drawing of an object or structure 40 to be fabricated in the form of a data file is placed in the memory of a computer 12 controlling the operation of apparatus 10, if computer 12 is not a CAD computer in which the original object design is effected. In other words, an object design may be effected in a first computer in an engineering or research facility and the data files transferred via wide or local area network, tape, disc, CD-ROM or otherwise as known in the art to computer 12 of apparatus 10 for object fabrication. The method will be exemplified by the packaging of a semiconductor die 44 with an object or structure 40 of protective polymeric dielectric material.

The data is preferably formatted in an STL (for StereoLithography) file, STL being a standardized format employed by a majority of manufacturers of stereolithography equipment. Fortunately, the format has been adopted for use in many solid-modeling CAD programs, so often translation from another internal geometric database format is unnecessary. In an STL file, the boundary surfaces of an object or structure 40 are defined as a mesh of interconnected triangles.

Apparatus 10 also includes a reservoir 14 (which may comprise a removable reservoir interchangeable with other reservoirs containing different materials) of liquid photopolymer material 16 to be employed in fabricating the intended object or structure 40. Preferably, the liquid photopolymer material 16 is hardened by exposure to light in the UV portion of the electromagnetic radiation spectrum. The surface level 18 of the liquid material 16 is automatically maintained at an extremely precise, constant magnitude by devices known in the art responsive to output of sensors within apparatus 10 and preferably under control of computer 12. U.S. Pat. No. 5,174,931, referenced above and previously incorporated herein by reference, discloses one suitable level control system.

A support platform or elevator 20 is shown, having an upper surface 30 and moved by platform actuator 36. Platform 20 is precisely vertically movable by actuator 36 in fine, repeatable increments responsive to control of computer 12 and is located for movement 46 downward into and upward out of liquid material 16 in reservoir 14. The platform 20 and/or structures placed on the platform may comprise a base upon which objects or structures 40 are formed by a stereolithographic process in this invention.

A laser 22 for generating a beam of light or laser beam 26 in the UV wavelength range has associated therewith appropriate optics and galvanometers. In one embodiment, the laser beam 26 is reflected by reflective apparatus 24 to shape and define laser beam 26 into laser beam 28, which is directed downwardly toward the surface 30 of platform 20 and scanned or traversed in the X-Y plane, that is to say in a horizontal plane, in a selected pattern under control of computer 12.

The thin layer of liquid photopolymer 16 which is exposed to laser beam 28 as it is scanned in an X-Y plane is at least partially cured thereby to at least a semisolid state for shape retention and surface smoothness.

Data from the STL files resident in the memory 34 of computer 12 is manipulated to build an object or structure 40 one layer 50A, 50B, 50C, 50D, etc at a time. The object or structure 40 is constructed on a base which may comprise the platform 20, a pre-existing object such as die 44 placed on the platform 20, or some other object. Accordingly, the data mathematically representing an object or structure 40 is divided into subsets, each subset representing a slice or layer 50A, 50B, 50C, etc. of object or structure 40. This is effected by mathematically sectioning the 3-D CAD model into a plurality of horizontal layers 50A, 50B, 50C, etc., a "stack" of such layers representing object or structure 40. Each slice or layer may be from about 0.0001 inch to about 0.0300 inch thick. The preferred range of layer thickness is from about 0.002 inch to about 0.020 inch. A slice or layer with a relatively small layer thickness 52 promotes higher resolution by enabling better reproduction of fine vertical surface features of an object or structure 40. In addition, attenuation of the laser beam by passage through the liquid photopolymer is minimized. On the other hand, an object or structure 40 formed of layers having greater thickness 52 will have fewer layers; thus, it is constructed with fewer scans of the laser beam 28 and the overall production rate is typically higher.

In some instances an initially formed base support or supports 42 for an object or structure 40 or a pre-existing object, i.e., semiconductor die 44, adjacent the object or structure 40 which is to be formed may also be programmed as a separate STL file. The use of such base supports 42 is exemplified in FIG. 2, which is an enlarged view of a portion of the platform 20 on which supports 42 are first formed to support semiconductor die 44. A packaging object or structure 40 is then fabricated about and over semiconductor die 44 in contact with the exterior surfaces 134 and 136 of semiconductor die 44. The exemplary package object or structure 40 is depicted as formed of four layers 50A, 50B, 50C and 50D, each formed by a separate horizontal scan or traverse of a laser beam 28. The base supports 42 facilitate fabrication of an object or structure 40 with reference to a perfectly horizontal plane above the surface 30 of platform 20 and may also be used, as appropriately configured, to rigidly maintain the semiconductor die 44 in a desired precise orientation for packaging.

Where a "recoater" blade 38 is employed as described below, the interposition of base supports 42 precludes inadvertent contact of blade 38 with platform surface 30. It is contemplated that base supports may be formed as upwardly projecting portions of a single structure extending across and protecting platform surface 30, as desired.

Before fabrication of an object or structure 40 is initiated with apparatus 10, the primary STL file for an object or structure 40 and the file for base support(s) 42 (if used) are merged. It should be recognized that, while reference has been made to a single object or structure 40, multiple objects or structures 40 of the same or different configurations may be concurrently fabricated on surface 30 of platform 20. In such an instance, the STL files for the various objects or structures 40 and supports 42, if any, are merged. Operational parameters for apparatus 10 are then set, for example, to adjust the size (diameter, if circular) of the laser beam 28 used to cure liquid photopolymer 16.

Before initiation of a first support layer for a support 42 or a first layer 50A for an object or structure 40 is commenced, computer 10 automatically checks and, if necessary, adjusts by means known in the art as referenced above, the surface level 18 of liquid material 16 in reservoir 14 to maintain same at an appropriate focal length for laser beam 28. U.S. Pat. No. 5,174,931, referenced above and previously incorporated by reference, discloses one suitable level control system. Alternatively, the height of reflective apparatus 24 may be adjusted responsive to a detected surface level 18 to cause the focal point of laser beam 28 to be located precisely at the surface of liquid material 16 at surface level 18 if level 18 is permitted to vary, although this approach is somewhat more complex.

The platform 20 may then be submerged in liquid material 16 in reservoir 14 to a depth equal to the thickness 52 of one layer or slice 50A of the object or structure 40, and the liquid surface level 18 readjusted as required to accommodate liquid material 16 displaced by submergence of platform 20. Laser 22 is then activated so that laser beam 28 will scan liquid material 16 over surface 30 of platform 20 to at least partially cure (e.g., at least partially polymerize) liquid material 16 at selected locations, defining the boundaries of a first layer 50A (of object or structure 40 or support 42, as the case may be) and filling in solid portions thereof.

Platform 20 is then lowered by a distance equal to the thickness 52 of a layer 50B, and the laser beam 28 scanned to define and fill in the second layer 50B while simultaneously bonding the second layer to the first. The process is then repeated, layer by layer, until object or structure 40 is completed.

If a recoater blade 38 is employed, the process sequence is somewhat different. In this instance, the surface 30 of platform 20 is lowered into liquid material 16 below surface level 18, then raised thereabove until it is precisely one layer's thickness 50A below blade 38. Blade 38 then sweeps horizontally over surface 30, or (to save time) at least over a portion thereof on which object or structure 40 or supports 42 are to be fabricated, to remove excess liquid material 16 and leave a film thereof of the precise, desired thickness 50A on surface 30. Platform 20 is then lowered so that the surface of the film and surface level 18 are coplanar and the surface of the material 16 is still. Laser 22 is then initiated to scan with laser beam 28 and define the first layer 50A. The process is repeated, layer by layer, to define each succeeding layer 50B, 50C, etc. and simultaneously bond same to the next lower layer until object or structure 40 (or supports 42, as the case may be) is completed. A more detailed discussion of this sequence and apparatus for performing same is disclosed in U.S. Pat. No. 5,174,931, previously incorporated herein by reference.

As an alternative to the above approach to preparing a layer of liquid material 16 for scanning with laser beam 28, a layer of liquid material 16 may be formed on surface 30 by lowering platform 20 to flood material 16 over surface 30 or over the highest completed layer S0 of object or structure 40, then raising platform 20 and horizontally traversing a so-called "meniscus" blade across the platform 20 (or just the formed portion of object or structure 40) one layer thickness 50 thereabove, followed by initiation of laser 22 and scanning of laser beam 28 to define the next higher layer 50.

As yet another alternative to layer preparation of liquid material 16 is to merely lower platform 20 to a depth equal to that of a layer of liquid material 16 to be scanned, and then traverse a combination flood bar and meniscus bar assembly (not shown) horizontally over platform 20 (or merely over the location of object or structure 40) to substantially concurrently flood liquid material 16 over platform 20 and define a precise layer thickness 50A of liquid material 16 for scanning.

All of the foregoing methods and apparatus for liquid material flooding and layer thickness control are known in the art.

Where a horizontal thickness dimension of the object or structure 40 is greater than two parallel passes of the laser beam, each layer 50 of object or structure 40 is preferably built by first defining any internal and external object boundaries of that layer 50 with laser beam 28, then hatching solid areas of object or structure 40 between those boundaries with laser beam 28. If a particular part of a particular layer 50 is to form a boundary of a void in the object or structure 40 above or below that layer 50, then the laser beam 28 is scanned in a series of closely spaced, parallel vectors so as to develop a continuous surface, or skin, with improved strength and resolution. The time it takes to form each layer 50 depends upon its geometry, surface tension and viscosity of material 16, thickness 52 of the layer 50, and laser scanning speed.

Figure 3:
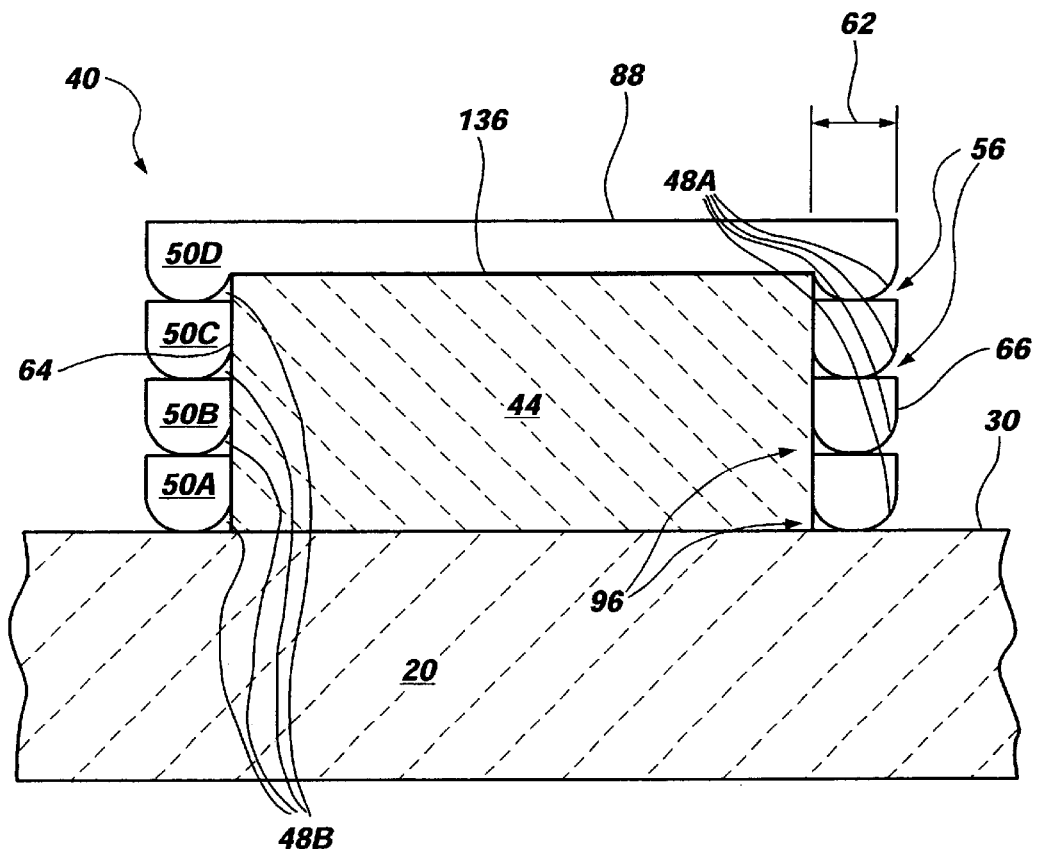
FIG. 3 is an enlarged cross-sectional side view of a portion of an STL platform supporting a semiconductor die with a conventional STL-fabricated package including side walls having a width of a single laser scan.

In the practice of stereolithographically packaging semiconductor devices and the like, a consistent problem has been the appearance of a "log cabin" effect on the side walls of the package. This problem is illustrated in FIG. 3. Due to the geometry and power distribution of the conventional circular laser beam 28, the lowermost corner regions including exterior lower corner regions 48A and interior lower corner regions 48B of each layer 50A, 50B, 50C, etc. do not receive sufficient UV radiation exposure to form a hardened, continuous wall surface. Instead, adjacent layers 50A, 50B, 50C, etc. are separated by longitudinal crevices 56 on the external wall surface 66, resulting in nonuniformity of the protective layer thickness 62, and a negative aesthetic effect. In addition, as noted previously, the crevices 56 are contaminant collectors and undesirably reduce wall thickness of object or structure 40. While interior crevices 96 also are formed on internal wall surfaces 64 adjacent the semiconductor die 44, liquid photopolymer trapped in the crevices 96 eventually hardens, which may be accelerated by elevating the temperature of object or structure 40 in an oven. Thus, there is no need for additional STL steps to fill the interior crevices 96.

There are several contributing factors to reduced polymerization in the side walls 54. First, the laser beam 28 which is used typically has a power density which is a maximum in the central portion of the beam, and which falls off rapidly toward the outer edges thereof Thus, edge portions of the structure being fabricated are deprived of laser energy.

Secondly, lateral scanning of a round beam spot 74 along a given path results in maximum power transfer (density) near the center of the path and much reduced power transfer near the edges of the path. This is true even for a laser beam 28 having a uniform power density throughout its transverse cross section. However, it is more typical to have a laser beam in which the power density is higher in the central portion of the beam, exacerbating the problem.

Figure 4:
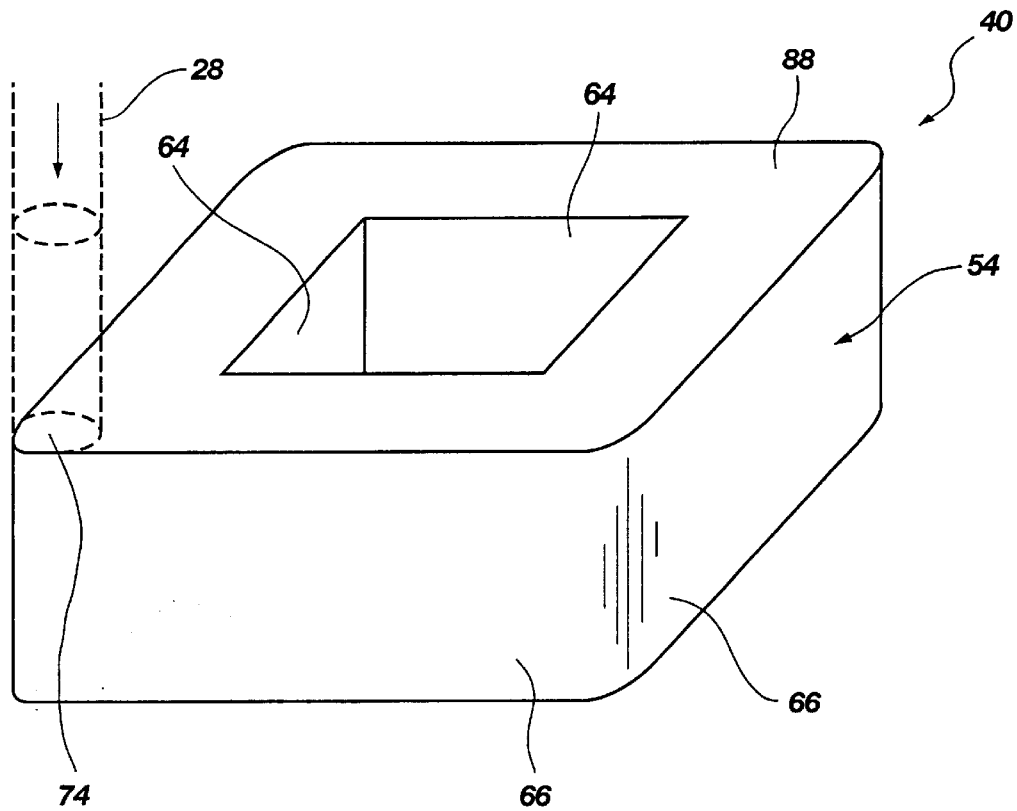
FIG. 4 is an enlarged perspective view of an object formed by an STL apparatus of the invention.
Figure 8:
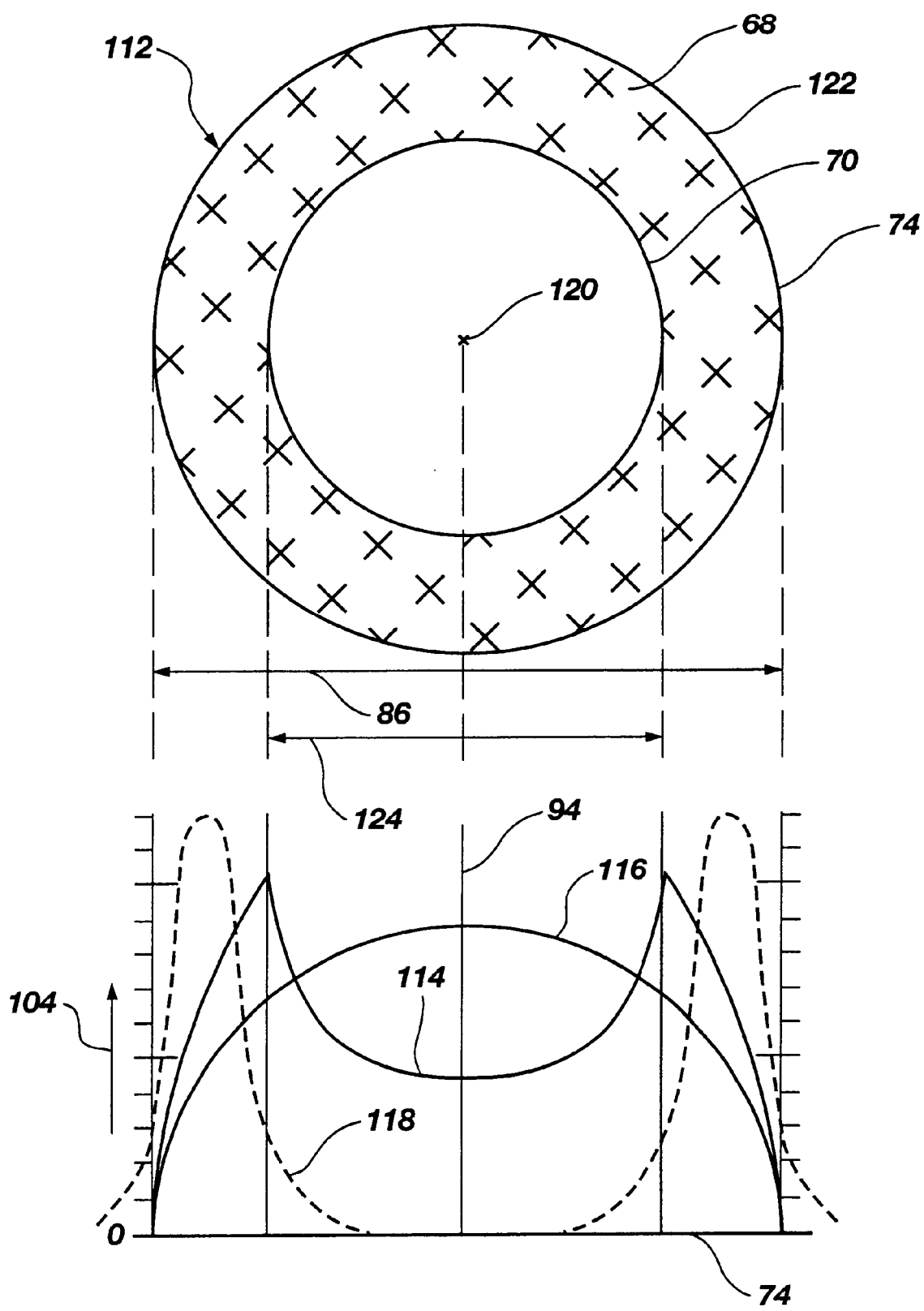
FIG. 8 is an axial view of an annular laser beam spot in accordance with the apparatus of the invention, indicating power distribution within the beam in several embodiments.

The remainder of this discussion will be in relation to the exemplary object or structure 40 depicted as designed in FIG. 4. The object or structure 40 is to have walls 54 with exterior surfaces 66, interior surfaces 64, and an upper surface 88. It may be formed as a stand-alone item or may be formed about another object, as for example about and over a semiconductor die. The object or structure 40 is constructed by an STL laser beam 28 focused to a spot 74 which is scanned to produce each layer. In the present invention, laser beam 28 is modified as depicted in FIG. 8 to form an annular laser beam spot 74 with reduced, or minimal power in a central "hole" 70 and substantially greater power in the annulus portion 68.

Figure 5:
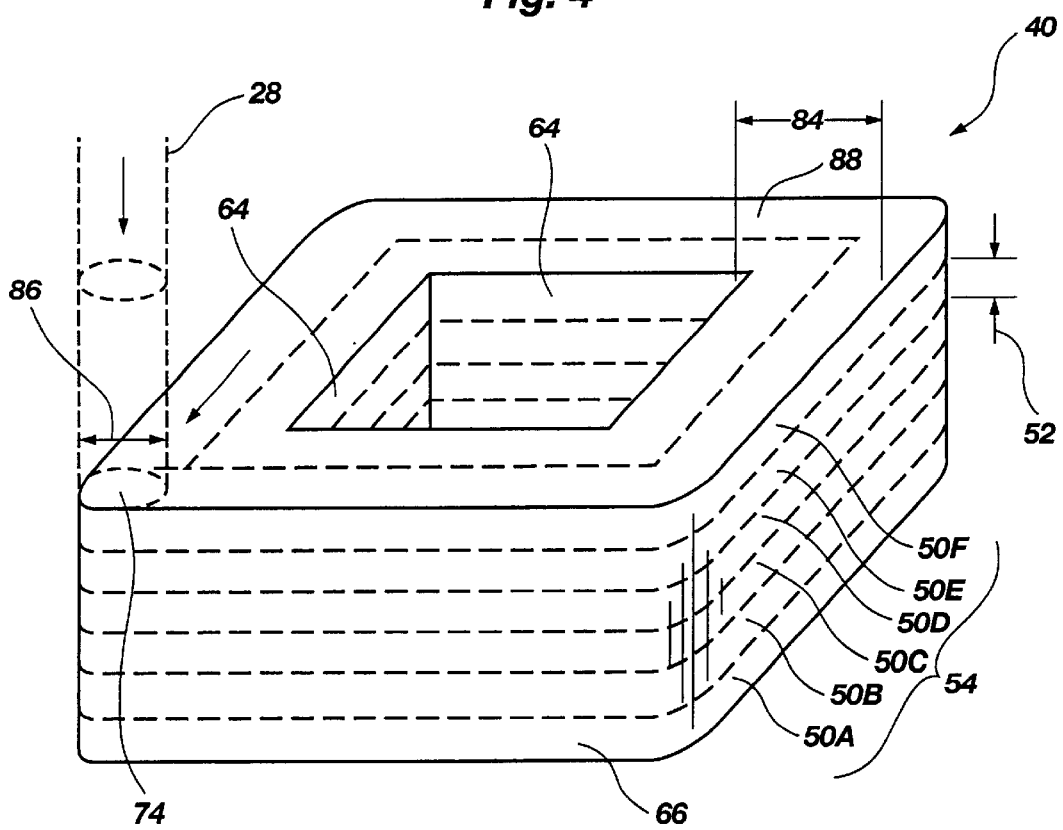
FIG. 5 is a perspective view of the object of FIG. 4, showing the boundaries of individual STL-formed layers.

As indicated in FIG. 5, the object or structure 40 is formed of a stack of layers 50A, 50B, 50C, etc. each having a layer thickness or depth identified by the numeral 52. The walls 54 in exemplary object or structure 40 are formed, by way of illustration only, in layers 50A, 50B, 50C, etc. defined in two parallel, mutually adjacent passes of a laser beam 28 and are depicted as having a thickness 84 equal to two diameters 86 of focused beam spot 74. Of course, it is possible and in many cases desirable (due to enhanced fabrication speed), if a wall thickness equal to only a single diameter 86 of focused beam spot 74 is desired, to form the walls of object or structure 40 through vertically superimposed, single passes of laser beam 28.

Figure 6:
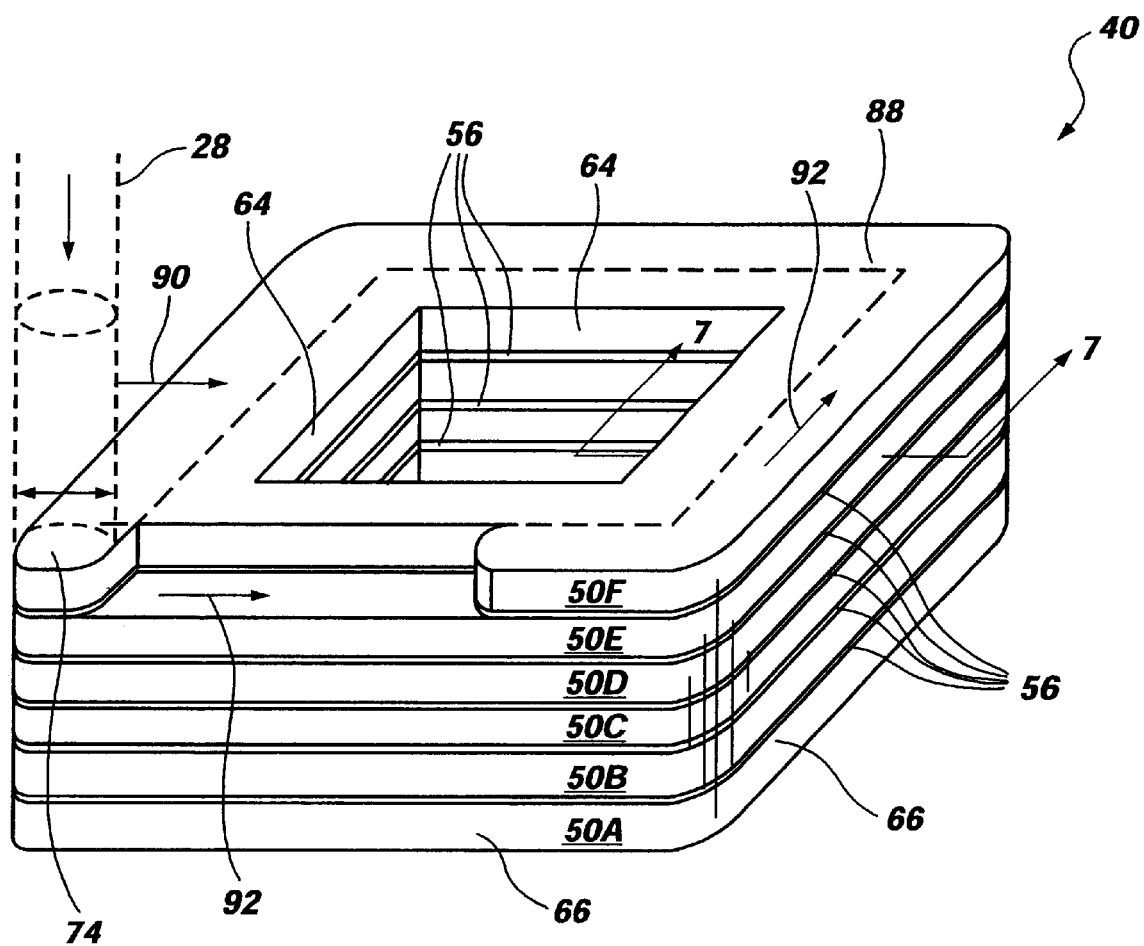
FIG. 6 is a perspective view of the object of FIG. 4 in a stage of construction by a conventional STL apparatus, showing side wall imperfections.
Figure 7:
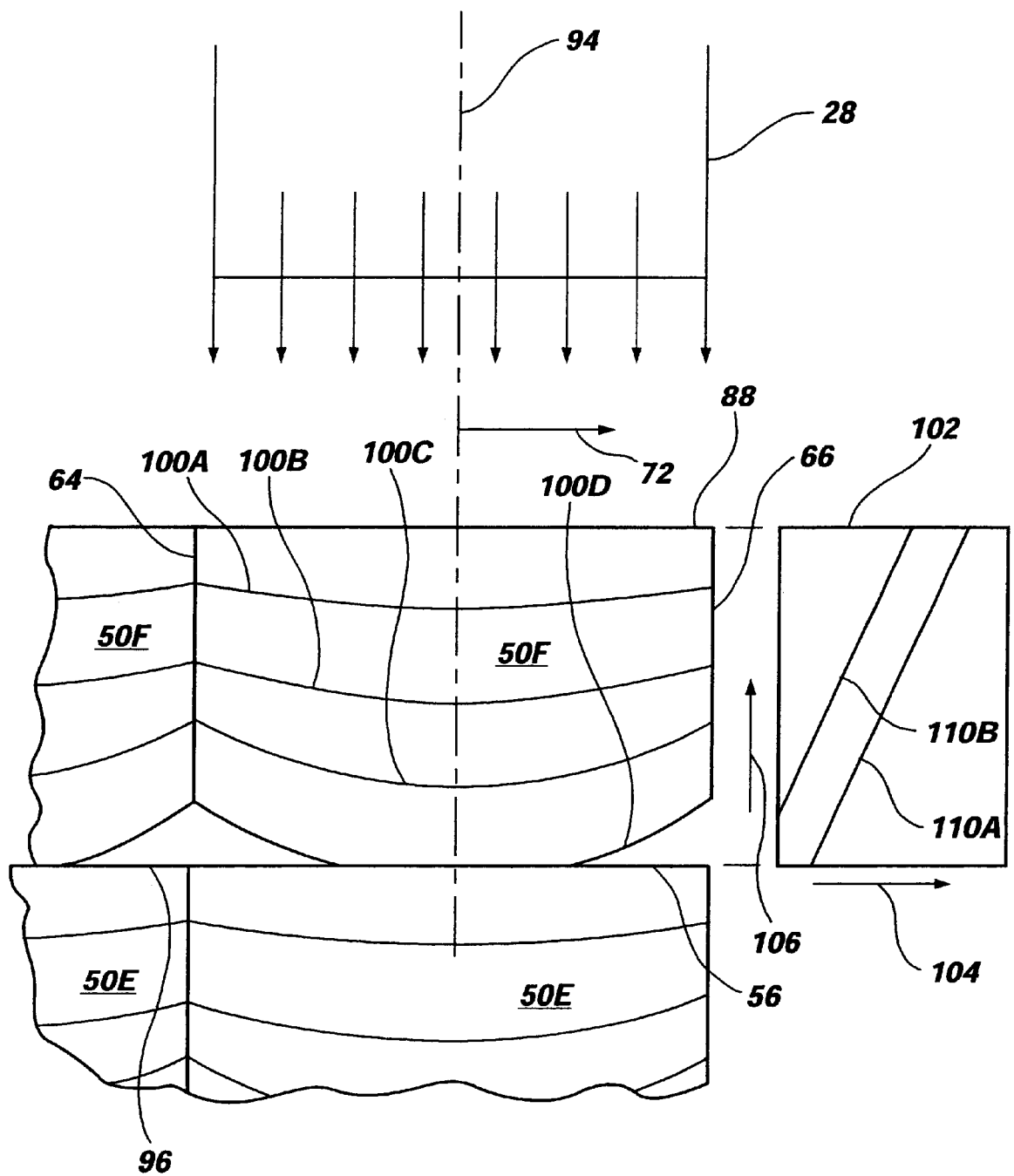
FIG. 7 is a cross-sectional side view of a portion of a side wall of an object formed by a conventional STL apparatus, as taken along line 7—7 of FIG. 6, and showing exemplary lines of equal power exposure within a layer thereof.

In FIGS. 6 and 7, object or structure 40 is shown in a stage of construction whereby the uppermost layer 50F is being formed by laser beam 28 as it is scanned or traversed in direction 90 along scan path 92. Using a conventional circular laser beam 28 with its centered power concentration, crevices 56 are formed along the lower corners of the formed layers, resulting in a log cabin effect. Even where the power density of the circular laser beam 28 is shaped to be uniform throughout the beam, such log cabin effect will still occur because of net exposure time drop-off as distance 72 from the beam path centerline 94 increases and the decrease in energy applied by circular laser beam 28 to the lower portion of the layer of liquid photopolymer 16 being cured as the energy is absorbed by the upper portion of the layer 50. There is no perceptible rounding of the upper edges of layers 50 as even minimal exposure to the laser beam 28 of the surface of the liquid photopolymer 16 will initiate polymerization. As shown, exemplary lines of equal net power density are denoted by numerals 100A, 100B, 100C, and 100D, where the power density decreases from 100A to 100D. At line 100D, the power density is insufficient to effect polymerization. In graph 102 at the right hand side of FIG. 7, the power density 104 is shown as a function of distance 106 from the upper surface 88 of the layer 50F. Line 110A refers to a vertical line along centerline 94, and line 110B refers to a vertical line along the wall surface 64 or 66. The present invention enables enhanced polymerization of each layer 50 of the object or structure 40, and is discussed below.

The stereolithography apparatus 10 preferably comprises a commercially available STL system which is modified by the invention to enable smoothing of vertical side walls 54 of STL formed objects or structures 40. For example and not by way of limitation, the SLA-250/50HR, SLA-5000 and SLA-7000 stereolithography systems, each offered by 3D Systems, Inc. of Valencia, Calif. are suitable for modification. Liquid photopolymers 16 believed to be suitable for use in practicing the present invention include Cibatool SL 5170 and SL 5210 resins for the SLA-250/50HR system and Cibatool SL 5530 resin for the SLA-5000 system, and Cibatool SL 7510 resin for the 7000 system. All of these resins are available from Ciba Specialty Chemicals Corporation. By way of example and not limitation, the layer thickness of material 16 to be formed, for purposes of the invention, may be on the order of about 0.0001 to about 0.030 inch, and more preferably, from about 0.001 to about 0.020 inch, with a high degree of uniformity over a field on a surface 30 of a platform 20. It should be noted that layers 50 having differing thicknesses 52 may be used to construct an object or structure 40, so as to form a structure of a precise, intended total height or to provide different material thicknesses 52 for different portions of the structure.

The size of the laser beam "spot" 74 impinging on the surface of liquid material 16 to cure same may generally be on the order of 0.001 inch to 0.01 inch, using presently available STL equipment. Resolution is preferably about ±0.0003 inch in the X-Y plane (parallel to surface 30) over at least a 0.5 inch×0.25 inch field from a center point, permitting a high resolution scan effectively across a 1.0 inch×0.5 inch area. Of course, it is desirable to have substantially this high a resolution across the entirety of surface 30 of platform 20 to be scanned by laser beam 28, which area may be termed the "field of exposure," such area being substantially coextensive with the vision field of a machine vision system employed in the apparatus of the invention as explained in more detail below. As the beam is scanned over a large field of exposure, the angle of incidence of the beam on surface 30 may be as high as about 5 degrees from the vertical. While this deviation from vertical may result in slightly nonvertical structures, the deviation is less than the acceptable angular deviation in transfer-molding device packages. The longer and more effectively vertical the path of laser beam 26, 28, the greater the achievable resolution.

Referring again to FIG. 1 of the drawings, it should be noted that apparatus 10 of the present invention includes a camera 76 which is in communication with computer 12 and preferably located, as shown, in close proximity to optics and scan controller, i.e., reflective apparatus 24 located above surface 30 of platform 20. Camera 76 may be any one of a number of commercially available cameras, such as capacitive-coupled discharge (CCD) cameras available from a number of vendors. Suitable circuitry as required for adapting the output of camera 76 for use by computer 12 may be incorporated in a board 82 installed in computer 12, which is programmed as known in the art to respond to images generated by camera 76 and processed by board 82. Camera 76 and board 82 may together comprise a so-called "machine vision system," and specifically a "pattern recognition system" (PRS), operation of which will be described briefly below for a better understanding of the present invention. Alternately, a self-contained machine vision system available from a commercial vendor of such equipment may be employed. For example, and without limitation, such systems are available from Cognex Corporation of Natick, Mass. For example, the apparatus of the Cognex BGA Inspection Package™ or the SMD Placement Guidance Package™ may be adapted to the present invention, although it is believed that the MVS-8000™ product family and the Checkpoint® product line, the latter employed in combination with Cognex PatMax™ software, may be especially suitable for use in the present invention.

It is noted that a variety of machine vision systems are in existence, examples of which and their structures and uses are described, without limitation, in U.S. Pat. Nos. 4,526, 646; 4,543,659; 4,736,437; 4,899,921; 5,059,559; 5,113, 565; 5,145,099; 5,238,174; 5,463,227; 5,288,698; 5,471, 310; 5,506,684; 5,516,023; 5,516,026; and 5,644,245. The disclosure of each of the immediately foregoing references is hereby incorporated by this reference.

In order to facilitate practice of the present invention with apparatus 10, a data file representative of the size, configuration, thickness and surface topography of a preexisting object or structure 40, for example, a particular type and design of semiconductor die 44 to be packaged, is placed in the memory 34 of computer 12. If the pre-existing object or structure 40, i.e., die 44, is to be packaged with a lead frame, data representative of the die 44 with an attached and electrically connected lead frame is provided. As shown in FIG. 2, if packaging material in the form of the aforementioned photopolymer 16 is to be applied only to an upper surface 136 (or portions thereof excluding active surface structures) of a die 44 to form upper package surface 88, or to the upper surface 136 and portions or all of the side surfaces 134 of a die 44, a large plurality of such dice 44 may be placed on surface 30 of platform 20 for packaging. If package side walls 54 are to be formed, it is desirable that the surface 30 of platform 20 comprise, or be coated or covered with, a material from which the at least partially cured material 16 defining the lowermost layers of the package side wall 54 may be easily released to prevent damage to the packaging. Alternatively, a solvent may be employed to release the package side walls 54 from platform 20 after packaging is completed. Such release and solvent materials are known in the art. See, for example, U.S. Pat. No. 5,447,822 referenced above and previously incorporated herein by reference.

Following mounting of the dice 44 on platform 20, camera 76 is then activated to locate the position and orientation of each die 44 to be packaged by scanning platform 20 and comparing the features of the dice 44 with those in the data file residing in memory 34, the locational and orientational data for each die 44 then also being stored in memory. It should be noted that the data file representing the design size, shape and topography for the dice 44 may be used at this juncture to detect physically defective or damaged dice 44 prior to packaging and to automatically delete such dice 44 from the packaging operation. It should also be noted that data files for more than one type (size, thickness, configuration, surface topography) of die 44 may be placed in computer memory 34 and the computer 12 programmed to recognize not only die locations and orientations, but which type of die 44 is at each location so that material 16 may be cured by laser beam 28 in the correct pattern and to the height required to define package side walls 54 and to provide a package upper surface 88 at the correct level and of the correct size and shape over each die 44.

Continuing with reference to FIGS. 1, 2 and 3 of the drawings, dice 44 on platform 20 may then be submerged partially below the surface level 18 of liquid material 16 to a depth the same as, or greater than the thickness of a first layer of material 16 to be at least partially cured to a semisolid state to form the lowest layer 50A of a package side wall 54 about each of dice 44 and then raised to a depth equal to the layer thickness, the surface of liquid material 16 being allowed to settle. The material 16 selected for use in packaging dice 44 may be one of the above-referenced resins from Ciba Specialty Chemical Company which exhibits a desirable dielectric constant, is of sufficient (semiconductor grade) purity, and which is of sufficiently similar coefficient of thermal expansion (CTE) so that the package structure, i.e., object or structure 40 and the die 44 itself are not stressed during thermal cycling in testing and subsequent normal operation.

Laser 22 is then activated and scanned to direct laser beam 28, under control of computer 12, about the periphery of each die 44 to effect the aforementioned partial cure of material 16 to form a first layer 50A. The platform 20 is then lowered into reservoir and raised to another side wall layer thickness-equaling depth increment 52 and the laser 22 activated to add another side wall layer 50B. This sequence continues, layer 50 by layer 50, until the package side walls 54 are built up about dice 44. A final layer or layers 50 may be applied over a portion or the entirety of the upper surface 136 of dice 44, forming an upper package surface 88 thereon. The layer thicknesses 52 may be controlled to differ, depending upon the thickness required to cover the upper surfaces 136 of the dice. For example, a greater total thickness of material may be required to cover a die 44 having wire bonds protruding upwardly therefrom than if a die 44 is covered before connection to a lead frame. It should also be noted that the total thickness of material 16 over a selected portion of a given die 44 may be altered die by die, again responsive to output of camera 76 or one or more additional cameras 78 or 80, shown in broken lines, detecting the protrusion of unusually high wire bond loops or other features projecting above the active surface of a given die 44 which should be, but is not, covered by the "design" or preprogrammed thickness of material 16 disposed over and at least partially cured on die upper surface 136. In any case, laser 22 is again activated to at least partially cure material 16 residing over each die 44 to form a package top of one or more layers 50, wherein the package top is substantially contiguous with package side walls 54. Laser beam 26 is controlled as desired to avoid certain surface features on dice 44, e.g., bond pads which are intended to be exposed for connection to higher-level packaging as by wire bonding, tape automated bonding (TAB) using flex circuits, or the use of projecting conductive connectors in a "flip chip" configuration. It should also be noted that the package top may be formed within an outer boundary defined by side walls 54 extending above upper (active) surface 136 and forming a dam thereabout. In this instance, the platform 20 may be submerged so that material 16 enters the area within the dam, raised above surface level 18, and then laser beam 28 activated and scanned to at least partially cure material 16 residing within the dam. Alternatively, a "skin" may be cured by STL over the upper surface 136 of the die 44, and liquid polymer 16 entrapped thereby will be subsequently cured in a final curing step.

When the final layer 50N is formed to complete the object or structure (die package) 40, platform 20 is elevated above surface level 18 of liquid material 16 and excess liquid 16 is drained from the STL-formed object or structure 40.

The object or structure 40 may be washed to remove all unpolymerized material 16 from the external surfaces. It should be noted that at this stage, the polymer comprising object or structure 40 is typically in various degrees of polymerization, including liquid polymer 16 trapped in internal crevices 96. Furthermore, the uppermost layer 50N may comprise a polymerized "skin" which traps unpolymerized or partially polymerized material 16 therebelow. Following removal of the object or structure 40 from the platform 20, a final curing step polymerizes and consolidates the object or structure 40, including any liquid polymer 16 in the internal crevices 96 or otherwise trapped within the object or structure 40.

Post-cure of die packages formed according to the present invention may be effected with broad-source UV radiation emanating from, for example, flood lights in a chamber through which dice are moved on a conveyor, or in large batches. Curing in an oven at, for example, 160° C. is another option which effects full curing of liquid polymer 16 in interior crevices 96 in the formed object or structure 40.

In the present invention, as depicted in FIG. 8, inadequate polymerization along the outer periphery of the laser beam spot 74 is avoided by the use of a laser beam 112 in which a major portion (or substantially all) of the power is located in a ring or outer annulus portion 68 of the beam. The "hole" 70 within the annulus portion 68 preferably has a very low power density, but in fact, any reduction in power density in the "hole" 70 is beneficial. In any case, it is preferred, although not required, that the laser power output in the central hole 70 be less than about 0.6 of the power output in the annulus portion 68. However, in all cases the power level in central hole 70 should be less than or equal to the power level in annulus portion 68.

For an annular laser beam 112 having a uniform power density in the annulus portion 68, the net power density 104 across the diameter 86 of the laser beam spot 74 as it is scanned may be as shown by numeral 114. The beam path centerline 94 is the line drawn by the central axis 120 of the moving laser beam 112. By way of comparison, a scanning full round beam will have the power density curve of 116.

In practice, the annulus portion 68 may have a power density curve 118 which may be nearly Gaussian. Of course, outer peripheral portions of the laser beam 112 (typically at lower densities) may be cut off to limit the laser beam 112 to the desired diameter 86. This also serves to enhance the power density at the outer periphery 122 of the laser beam 112 and provide a sharp separation for precise definition of an object's wall surfaces 64, 66.

The diameter 124 of the "hole" relative to the spot diameter 86 may be expressed as a ratio $R_D$ having any value between about 0.1 and about 0.9. However, from a practical standpoint, the effective power exerted to the liquid photopolymer 16 scanned by the hole 70 should be sufficient to at least form a skin of hardened material over liquid photopolymer material 16 trapped within the layer. Thus, a compromise will yield an R of between about 0.3 and 0.8, which is a preferred range. In the example shown in FIG. 8, R=0.64.

In a preferred embodiment, ratio $R_{LPD}$, the distribution of laser power density in the annulus portion 68 and hole 70, and scanning speed are all specified or controlled so that in a single pass the wall surfaces to be formed are fully exposed to sufficient polymerizing power to form self-supporting walls exhibiting smooth surfaces, while simultaneously scanned portions in central portions of the scan path 92 are sufficiently exposed to form a semihardened skin over underlying liquid photopolymer 16 in each layer. As a result, the output of the STL apparatus 10 is maximized.

It should be noted that the laser beam may be a continuous wave (CW) beam or may be a rapidly repeating, intermittently pulsed beam, for example, having a pulse frequency which may be used effectively to smooth out variations in wall surfaces caused by the scanning motion. The pulse may comprise a waveform variance in power between a maximum and a minimum or comprise pulses having intermittent zero power time segments therebetween.

There are several ways to produce an annular or semiannular laser beam 112 for use in a stereolithography apparatus 10. In one method, for example, a nitrogen ring laser, as known in the art, produces a beam which is somewhat annular with respect to power density.

In another embodiment, the laser system used to achieve the desired annular spot in an STL apparatus may be configured as follows. The laser system may include an unstable optical resonator whereby power flows outwardly from the optical axis of the resonator. The optical resonator may be a confocal resonator employing one concave mirror and one convex mirror. The convex mirror forms the output coupling device for providing diffraction output coupling around the periphery of the output mirror. The output beam is collimated and focused to an annulus with a central "hole" of significantly reduced radiation density. The use of such apparatus to form high power annular laser beams, such as for metal cutting and the like, is known in the art. See, for example, U.S. Pat. No. 4,310,808, the disclosure of which is hereby incorporated herein by this reference.

Other methods for producing an annular laser beam of the desired shape, size, power and wavelength may exist, of which the inventors are currently unaware. Such methods may include optical, opto-mechanical, chemical and other technologies.

Using the particular laser beam configuration of the invention, an object or structure 40 such as a semiconductor die package may be formed with smooth, uniform thickness side wall surfaces 64 and 66 in minimal time within apparatus 10. A log cabin exterior, with attendant problems and deficiencies, is avoided. In this invention, portions of the object or structure 40 which need to be adequately polymerized (i.e. hardened) receive a major portion of the beam power, without necessitating either an increase of the laser's total output power, or scanning at a reduced speed.

While the present invention has been disclosed in terms of certain preferred embodiments, those of ordinary skill in the art will recognize and appreciate that the invention is not so limited. Additions, deletions and modifications to the disclosed embodiments may be effected without departing from the scope of the invention as claimed herein.

What is claimed is:

1. A method of forming a three dimensional structure from a liquid material, comprising:

subjecting a depth of electromagnetic radiation-curable, liquid material lying over a horizontal support surface to a substantially vertical beam of electromagnetic radiation focused to a generally annular spot exhibiting a generally annular cross-sectional shape having an outer, annular portion of relatively greater power density than an inner, central portion thereof surrounded by said outer, annular portion; and horizontally traversing said generally annular spot above said horizontal support surface.

2. A method of forming a three dimensional structure from a liquid polymer, comprising:

subjecting a depth of liquid polymer adapted to polymerize responsive to exposure to laser light and lying over a horizontal support surface to a substantially vertical beam of laser light focused to a generally annular spot exhibiting a generally annular cross-sectional shape having an outer, annular portion of relatively greater power density than an inner, central portion thereof surrounded by said outer, annular portion; and horizontally traversing said generally annular spot above said horizontal support surface.

3. The method of claim 1, wherein said generally annular spot is focused to have an outer diameter of about 0.001 to about 0.01 inch.

4. The method of claim 1, wherein said generally annular spot is focused such that said inner, central portion has a diameter of about 0.3 to 0.8 times an outer diameter of said outer, annular portion.

5. The method of claim 1, wherein said generally annular spot is focused such that said inner, central portion has a diameter of about 0.1 to 0.9 times an outer diameter of said outer, annular portion.

6. The method of claim 1, wherein said generally annular spot is focused such that said power density of said inner, central portion is less than about 0.6 times said power density of said outer, annular portion.

7. The method of claim 1, wherein said generally annular spot is focused such that said power density of said inner, central portion of said spot is substantially zero.

8. The method of claim 1, further comprising generating said substantially vertical beam of electromagnetic radiation as a continuous wave beam.

9. The method of claim 1, further comprising generating said substantially vertical beam of electromagnetic radiation as an intermittent, repeatedly pulsed beam.

10. The method of claim 1, further comprising generating said substantially vertical beam of electromagnetic radiation to have at least one wavelength in the ultraviolet spectrum.

11. The method of claim 1, further comprising generating said substantially vertical beam of electromagnetic radiation with a nitrogen ring laser.

12. The method of claim 1, further comprising:

generating a beam of electromagnetic radiation by directing optical power outwardly from a central axis of an unstable optical resonator and directing said optical power from said unstable optical resonator with a coupling device;

aligning said beam of electromagnetic radiation from said coupling device with a collimator; and focusing said beam of electromagnetic radiation to form said substantially vertical beam of electromagnetic radiation.

13. The method of claim 12, wherein said unstable optical resonator is selected to comprise a confocal resonator having a convex mirror and a concave mirror, wherein said coupling device comprises said convex mirror positioned to reflect a portion of said beam of electromagnetic radiation away from the resonator central axis.

14. The method of claim 12, wherein said collimator is selected to comprise an optical lens.

15. The method of claim 12, wherein focusing said beam of electromagnetic radiation comprises using a lens to focusing said beam of electromagnetic radiation to said generally annular spot.

16. The method of claim 2, wherein said generally annular spot is focused to have an outer diameter of about 0.001 to about 0.01 inch.

17. The method of claim 2, wherein said generally annular spot is focused such that said inner, central portion has a diameter of about 0.3 to 0.8 times an outer diameter of said outer, annular portion.

18. The method of claim 2, wherein said generally annular spot is focused such that said inner, central portion has a diameter of about 0.1 to 0.9 times an outer diameter of said outer, annular portion.

19. The method of claim 2, wherein said generally annular spot is focused such that said power density of said inner, central portion is less than about 0.6 times said power density of said outer, annular portion.

20. The method of claim 2, wherein said generally annular spot is focused such that said power density of said inner, central portion of said spot is substantially zero.

21. The method of claim 2, further comprising generating said substantially vertical beam of laser light as a continuous wave beam.

22. The method of claim 2, further comprising generating said substantially vertical beam of laser light as an intermittent, repeatedly pulsed beam.

23. The method of claim 2, further comprising generating said substantially vertical beam of laser light to have at least one wavelength in the ultraviolet spectrum.

24. The method of claim 2, further comprising generating said substantially vertical beam of laser light with a nitrogen ring laser.

25. The method of claim 2, further comprising:

generating a beam of electromagnetic radiation by directing optical power outwardly from a central axis of an unstable optical resonator and directing said optical power from said unstable optical resonator with a coupling device;

aligning said beam of electromagnetic radiation from said coupling device with a collimator; and focusing said beam of electromagnetic radiation to form said substantially vertical beam of laser light.

26. The method of claim 25, wherein said unstable optical resonator is selected to comprise a confocal resonator having a convex mirror and a concave mirror, wherein said coupling device comprises said convex mirror positioned to reflect a portion of said beam of electromagnetic radiation away from the resonator central axis.

27. The method of claim 25, wherein said collimator is selected to comprise an optical lens.

28. The method of claim 25, wherein focusing said beam of electromagnetic radiation comprises using a lens to focusing said beam of electromagnetic radiation to said generally annular spot.

* * * * *